United States Patent [19]

Moriya

[11] Patent Number: 5,284,418
[45] Date of Patent: Feb. 8, 1994

[54] ELECTRIC PITCH CONTROL APPARATUS FOR VARIABLE PITCH PROPELLER CAPABLE OF CONTROLLING THE PITCH ANGLE BASED INSTANTANEOUS OPERATIONAL CONDITIONS OF THE PROPELLER

[75] Inventor: Yoshihito Moriya, Nagoya, Japan

[73] Assignee: Toyota Jidosha Kabushiki Kaisha, Aichi, Japan

[21] Appl. No.: 921,196

[22] Filed: Jul. 28, 1992

[30] Foreign Application Priority Data

Jul. 29, 1991 [JP] Japan ................... 3-212710
Aug. 6, 1991 [JP] Japan ................... 3-222053

[51] Int. Cl.$^5$ ............................ B64C 11/44
[52] U.S. Cl. ............................ 416/35; 416/36; 416/44; 364/431.01
[58] Field of Search .................. 416/25, 27, 30, 35, 416/36, 38, 40, 44; 415/17, 30; 364/431.01

[56] References Cited

U.S. PATENT DOCUMENTS

| | | | |
|---|---|---|---|
| 2,619,183 | 11/1952 | Chillson et al. | |
| 2,640,550 | 6/1953 | Knapp et al. | |
| 2,667,228 | 1/1954 | Wood et al. | |
| 2,849,072 | 8/1958 | Brahm | 416/36 |
| 3,589,830 | 6/1971 | Mogren et al. | |
| 4,297,589 | 10/1981 | Bashnin et al. | 415/30 |
| 4,772,179 | 9/1988 | Bennet et al. | |
| 4,958,289 | 9/1990 | Sum et al. | 364/431.01 |
| 4,995,232 | 2/1991 | Sutton | 364/431.01 |
| 5,019,006 | 5/1991 | Schneider et al. | |
| 5,029,091 | 7/1991 | Schneider et al. | 364/431.01 |
| 5,061,212 | 10/1991 | Morgenthaler et al. | 440/50 |

FOREIGN PATENT DOCUMENTS

| | | |
|---|---|---|
| 0311277 | 4/1989 | European Pat. Off. . |
| 0322343 | 6/1989 | European Pat. Off. . |
| 52-75792 | 6/1977 | Japan . |
| 60-76499 | 4/1985 | Japan . |
| 223641 | 9/1990 | Japan ............ 364/431.01 |

*Primary Examiner*—Edward K. Look
*Assistant Examiner*—Michael S. Lee
*Attorney, Agent, or Firm*—Kenyon & Kenyon

[57] ABSTRACT

An electric pitch control apparatus for a variable-pitch propeller capable of properly controlling the pitch angle of the propeller blade in accordance with instantaneous operational conditions of the propeller and of effecting adjustment of the pitch angle of the propeller blade without any delay of a time in response to operation of the engine output lever for promptly coinciding an actual rotational number of the prime engine with a target rotational number.

4 Claims, 10 Drawing Sheets

ELECTRIC PITCH CONTROL APPARATUS FOR VARIABLE PITCH PROPELLER CAPABLE OF CONTROLLING THE PITCH ANGLE BASED INSTANTANEOUS OPERATIONAL CONDITIONS OF THE PROPELLER

BACKGROUND OF THE INVENTION

1. Field of the Invention

The present invention relates to a propeller system for installation in aircrafts, and more particularly to an electric pitch control apparatus for a variable-pitch propeller.

2. Description of the Prior Art

A conventional pitch control mechanism for a variable-pitch propeller includes a hydraulic actuator which is operated under control of a governor to vary a pitch angle of the propeller blade. The governor is mechanically operated to detect a difference between target and actual rotational numbers of the propeller for controlling a supply amount of hydraulic fluid under pressure to the hydraulic actuator. The operation timing of the governor is manually adjusted by a pilot of the aircraft, separately from operation of an output lever for torque control of a prime engine of the aircraft. It is, therefore, difficult to properly control the pitch angle of the propeller blade in accordance with an instantaneous operational condition of the propeller.

To overcome such a difficulty, there has been proposed a pitch control apparatus which is designed to determine a target rotational number of the prime engine in response to operation of the engine output lever and to control the pitch angle of the propeller blade in such a manner as to coincide an actual rotational number of the prime engine with the target rotational number. In the case that a supply amount of hydraulic fluid under pressure to the hydraulic actuator is controlled in accordance with a difference between the actual and target rotational numbers of the prime engine, however, there will occur response delay in operation of the hydraulic actuator and the component parts of the pitch control mechanism. As a result, adjustment of the pitch angle of the propeller blade to a desired value is effected with delay of a time after operation of the engine output lever. For this reason, a hunting phenomenon in rotation of the propeller will occur particularly when the difference between the target and actual rotational numbers of the prime engine becomes less than a predetermined value, and it takes a time for coinciding the actual rotational number with the target rotational number.

SUMMARY OF THE INVENTION

It is, therefore, a primary object of the present invention to provide an electric pitch control apparatus for a variable-pitch propeller capable of properly controlling the pitch angle of the propeller blade in accordance with instantaneous operational conditions of the propeller and of effecting adjustment of the pitch angle of the propeller blade without any delay of a time in response to operation of the engine output lever for promptly coinciding the actual rotational number of the prime engine with the target rotational number.

According to the present invention, the object is accomplished by providing an electric pitch control apparatus for a variable-pitch propeller of an aircraft equipped with a pitch control mechanism having an electrically controlled actuator for controlling a pitch angle of the propeller blade in accordance with a control current applied thereto, which comprises an engine rotation sensor for detecting an actual rotational number of a prime engine of the aircraft, a throttle sensor for detecting an opening degree of a throttle of the prime engine, first means for determining a target rotational number of the prime engine in relation to the opening degree of the engine throttle, second means for calculating a difference between the target and actual rotational numbers of the prime engine, third means for determining a standard control value in relation to the calculated difference in rotational number, and fourth means for producing a control current defined by the standard control value and for applying the control current to the pitch control mechanism so that the pitch angle of the propeller blade is varied by operation of the actuator to coincide the actual rotational number of the prime engine with the target rotational number. The electric pitch control apparatus further comprises means for determining a first correction value in relation to the calculated difference in rotational number, means for determining a second correction value in relation to the rate of change of the calculated difference in rotational number, and means for correcting the standard control value based on the first and second correction values.

According to an aspect of the present invention, the means for determining a first correction value comprises means for determining the first correction value as a positive value when an absolute value of the calculated difference in rotational number is less than a predetermined value and for determining the first correction value as zero when the absolute value of the calculated difference in rotational number is more than the predetermined value.

According to another aspect of the present invention, the electric pitch control apparatus further comprises a flight speed sensor for detecting a flight speed of the aircraft and means for determining a correction coefficient in relation to the flight speed of the aircraft, wherein the first means comprises means for determining a standard rotational number of the prime engine in relation to the opening degree of the engine throttle and means for determining the target rotational number on a basis of the standard rotational number and the correction coefficient.

According to a further aspect of the present invention, the means for determining a correction coefficient comprises means for linearly decreasing the correction coefficient from a predetermined value in accordance with increase of the flight speed from zero to a predetermined speed at which the aircraft takes off and for maintaining the correction coefficient as a constant value during flight of the aircraft at a higher speed than the predetermined speed.

BRIEF DESCRIPTION OF THE DRAWINGS

Additional objects, features and advantages of the present invention will be more readily appreciated from the following detailed description of preferred embodiments thereof when taken together with the accompanying drawings, in which:

FIGS. 15 (a) to (c) are modified maps for determining the correction coefficient in relation to the flight speed of the aircraft.

DESCRIPTION OF THE PREFERRED EMBODIMENTS

Figure 1:
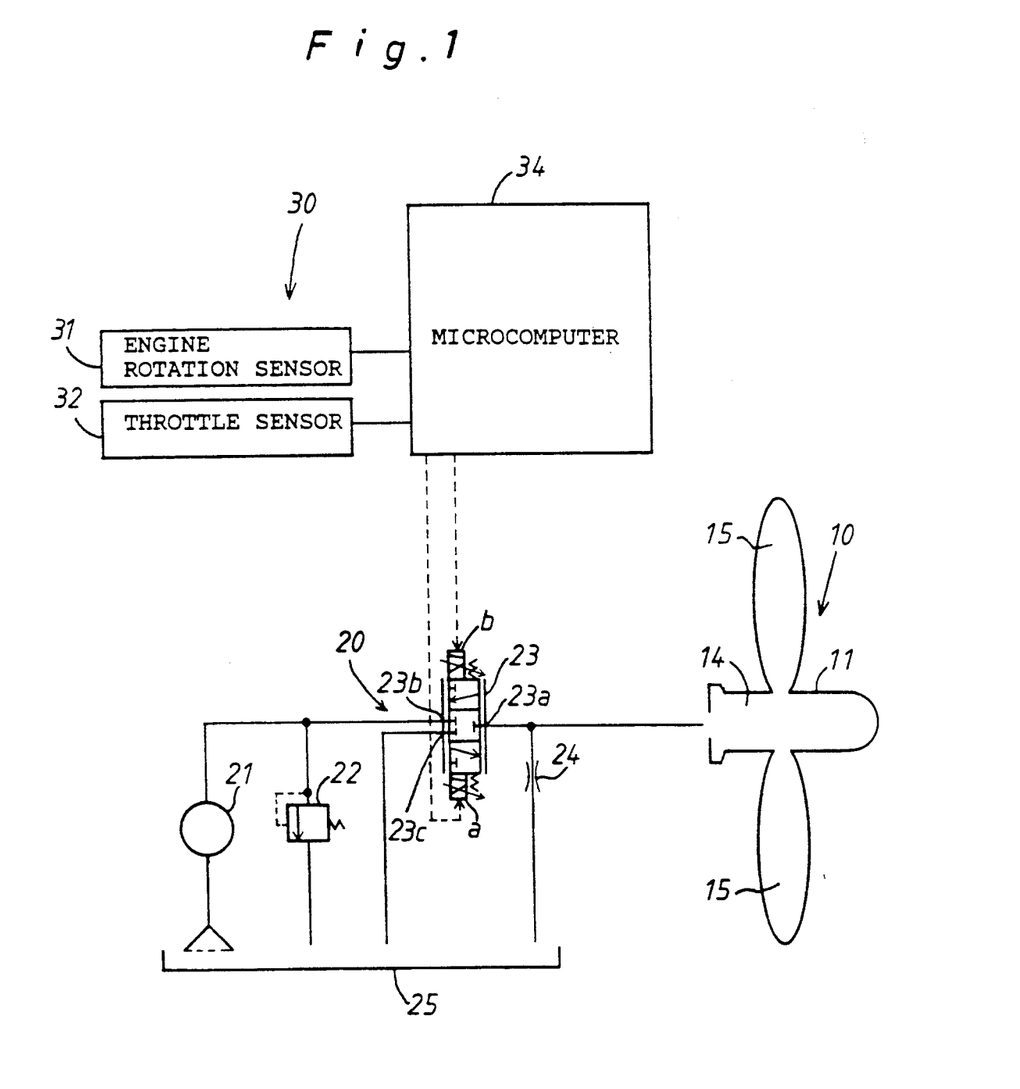
FIG. 1 is a circuit diagram of a hydraulic control system in combination with an electric pitch control apparatus according to the present invention.
Figure 2:
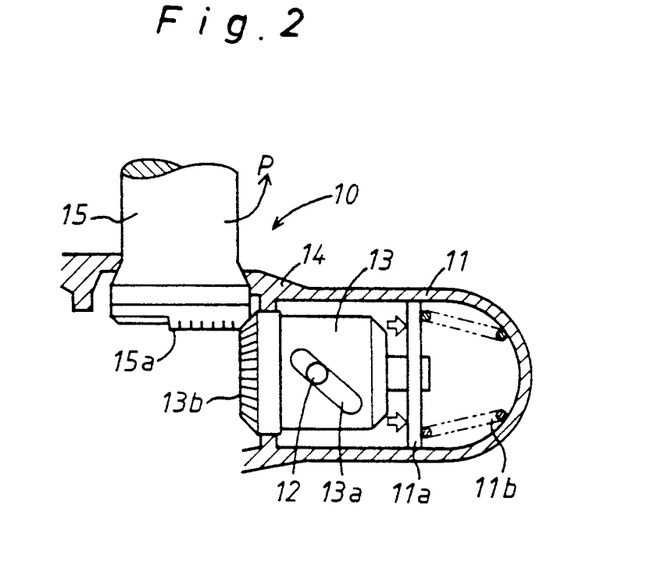
FIG. 2 is a sectional view of a pitch control mechanism of a propeller shown in FIG. 1.
Figure 3:
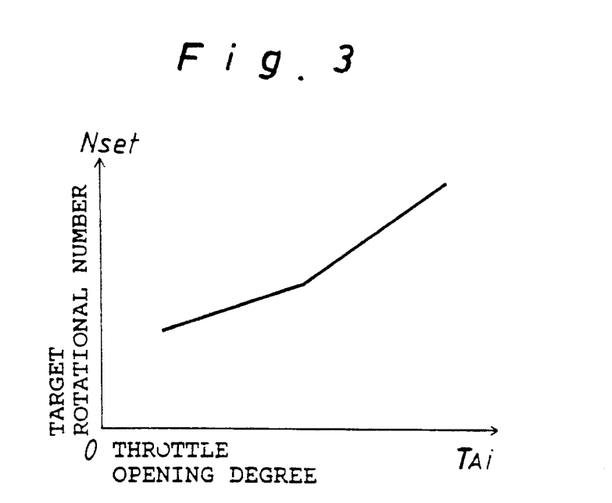
FIG. 3 is a map showing a target rotational number $N_{set}$ of a prime engine in relation to an opening degree $T_{Ai}$ of the engine throttle.
Figure 4:
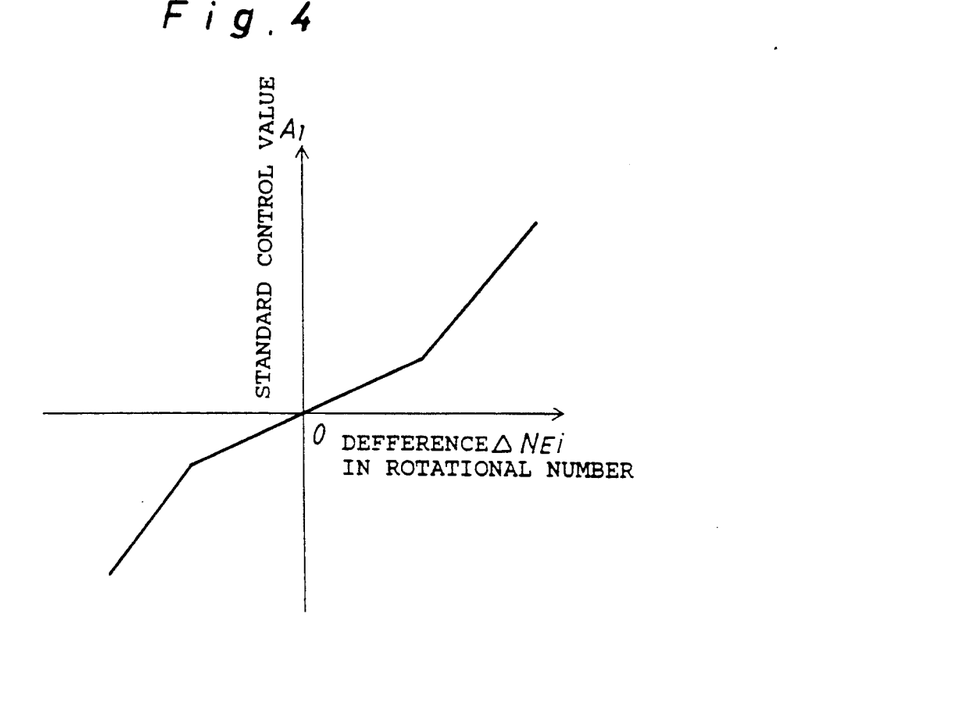
FIG. 4 is a map showing a standard control value $A_1$ in relation to a difference $N_{Ei}$ between the target rotational number $N_{set}$ and an actual rotational number $N_{Ei}$ of the prime engine.

In FIG. 1 of the drawings, there is schematically illustrated an electro-hydraulic pitch control system for a variable-pitch propeller which comprises a pitch control mechanism 10, a hydraulic control circuit 20 and an electric pitch control apparatus 30 according to the present invention. As shown in FIG. 2, the pitch control mechanism 10 includes a hydraulic cylinder 11 provided with a reciprocating piston 11a loaded by a return spring 11b, a follower pin 12 mounted on a rod portion of piston 11a for movement therewith, a hub member 13 rotatably mounted within a housing 14 integral with the hydraulic cylinder 11 and retained in place in an axial direction, the hub member 13 being formed with a cam slot 13a in engagement with the follower pin 12, a bevel gear 13b integrally provided on one end of hub member 13, and a bevel gear 15a rotatably mounted within the housing 14 and retained in place in an axial direction, the bevel gear 15a being integrally formed with a blade butt 15 of the propeller and meshed with the bevel gear 13b. Assuming that the hydraulic cylinder 11 has been applied with hydraulic fluid under pressure from the hydraulic control circuit 20, the piston 11a is moved rightward against the load of return spring 11b to rotate the blade butt 15 in a direction shown by an arrow P in FIG. 2. As a result, the pitch angle of the propeller blade is varied to be a coarse pitch angle.

As shown in FIG. 1, the hydraulic control circuit 20 includes a fluid pump 21 arranged to be driven by a prime engine of the aircraft, a relief valve 22 arranged to define a maximum pressure of hydraulic fluid discharged from pump 21, an electromagnetic flow control valve 23, and a throttle 24. The electromagnetic flow control valve 23 is operated under control of the electric pitch control apparatus 30 to control the quantity of hydraulic fluid under pressure supplied into or discharged from the hydraulic cylinder 11. The flow control valve 23 is provided with solenoids a and b to be selectively energized by a control current applied thereto from the electric pitch control apparatus 30. The flow control valve 23 is designed to be retained in a neutral position during deenergization of its solenoids a and b. In a condition where the flow control valve 23 is retained in the neutral position, an outlet port 23a in connection to the hydraulic cylinder 11 is disconnected from inlet ports 23b and 23c respectively in connection to the delivery port of pump 21 and to a fluid reservoir 25. When the solenoid a is energized, the flow control valve 23 is displaced to provide a fluid connection between ports 23a and 23b for effecting the supply of hydraulic fluid under pressure into the hydraulic cylinder 11 from pump 21. When the solenoid b is energized, the flow control valve 23 is displaced to provide a fluid connection between ports 23a and 23c for discharging the hydraulic fluid from the hydraulic cylinder 11 into the fluid reservoir 25.

The throttle 24 is arranged to allow a small quantity of hydraulic fluid under pressure flowing therethrough into the fluid reservoir 25. If the electric pitch control apparatus 30 is damaged or the leading wires of solenoids a, b are disconnected in operation, the flow control valve 23 will be returned to and retained in the neutral position to disconnect the outlet port 23a from the inlet ports 23b and 23c. Thus, the pressure in hydraulic cylinder 11 is maintained to avoid a sudden change of the pitch angle of the propeller blade. In such a condition, the throttle 24 causes the hydraulic fluid from cylinder 11 to gradually discharge therethrough into the fluid reservoir 25. As a result, the piston 11a of cylinder 11 is moved leftward by the load of return spring 11b to vary the pitch angle of the propeller blade to a fine pitch angle for fail safe.

The electric pitch control apparatus 30 includes an engine rotation sensor 31 for detecting a rotational number $N_{Ei}$ of the prime engine of the aircraft, a throttle sensor 32 for detecting an opening degree of the engine throttle, and a microcomputer 34 connected to the sensors 31 and 32. The microcomputer 34 has an interface arranged to be applied with detection signals from the sensors 31, 32, a read-only memory or ROM arranged to store a control program shown by a flow chart in FIG. 8 and maps necessary for processing the control program, a central processing unit or CPU for execution of the control program, and a random-acess memory or RAM arranged to temporarily memorize variables for execution of the control program.

The maps stored in the ROM are in the form of four kinds of two dimensional maps shown in FIGS. 3, 4, 5 and 6, respectively representing a target rotational number $N_{set}$ of the prime engine in relation to an opening degree $T_{Ai}$ of the engine throttle, a standard control value $A_1$ in relation to a difference $\Delta N_{Ei}$ between the target rotational number $N_{set}$ and an actual rotational number $N_{Ei}$ of the prime engine, a first correction value $A_2$ in relation to the difference $\Delta N_{Ei}$ in rotational number, and a second correction value $A_3$ in relation to a difference $\Delta N_{Ei}$ between instant and prior differences $\Delta N_{Ei}$ and $\Delta N_{Ei-1}$ calculated at a predetermined time interval $\Delta t$. The target rotational number $N_{set}$ is defined to be approximately proportional to the opening degree $T_{Ai}$ of the engine throttle, and the standard control value $A_1$ is defined to be approximately proportional to the difference $\Delta N_{Ei}$ in rotational number for controlling a supply amount of electric current to the flow control valve 23 on a basis of the difference $\Delta N_{Ei}$ in rotational number. When the difference $\Delta N_{Ei}$ in rotational number is positive, the flow control valve 23 is energized by a control current applied to its solenoid b to discharge an amount $Q_1$ of hydraulic fluid from the hydraulic cylinder 11. When the difference $\Delta N_{Ei}$ in rotational number is negative, the flow control valve 23 is energized by a control current applied to its solenoid a to supply an amount $Q_1$ of hydraulic fluid to the hydraulic cylinder 11.

The first correction value $A_2$ is defined as a positive value when an absolute value of the difference $\Delta N_{Ei}$ in rotational number is less than a predetermined value $\Delta N_{Eo}$ and is defined as zero (0) when the absolute value of the difference $\Delta N_{Ei}$ in rotational number is more than the predetermined value $\Delta N_{Eo}$. A multiplied value ($A_2 \times A_3$) of the first and second correction values $A_2$ and $A_3$ represents a correction value for the standard control value $A_1$ which exists when the absolute value of the difference $\Delta N_{Ei}$ in rotational number is less than the predetermined value $\Delta N_{Eo}$. In addition, the predetermined value $\Delta N_{Eo}$ is defined in consideration with such a difference $\Delta N_{Ei}$ in rotation number as causing a hunting phenomenon in rotation of the propeller. The second correction value $A_3$ is defined to be proportional to the difference $D\Delta N_{Ei}$ in rotational number. Thus, the multiplied value ($A_2 \times A_3$) of the first and second correction values is adapted to correct the standard control value $A_1$ on a basis of the rate of change of the difference $\Delta N_{Ei}$ in rotational number. In the case that there is not any problem in the ascending characteristic of the correction value ($A_2 \times A_3$) in relation to change of the difference $\Delta N_{Ei}$ in rotational number, the triangle shape in the map of FIG. 5 may be modified to a trapezoid shape or a rectangular shape. The maps are theoretically determined in consideration with the characteristics of the prime engine and the variable-pitch propeller.

Figure 8:
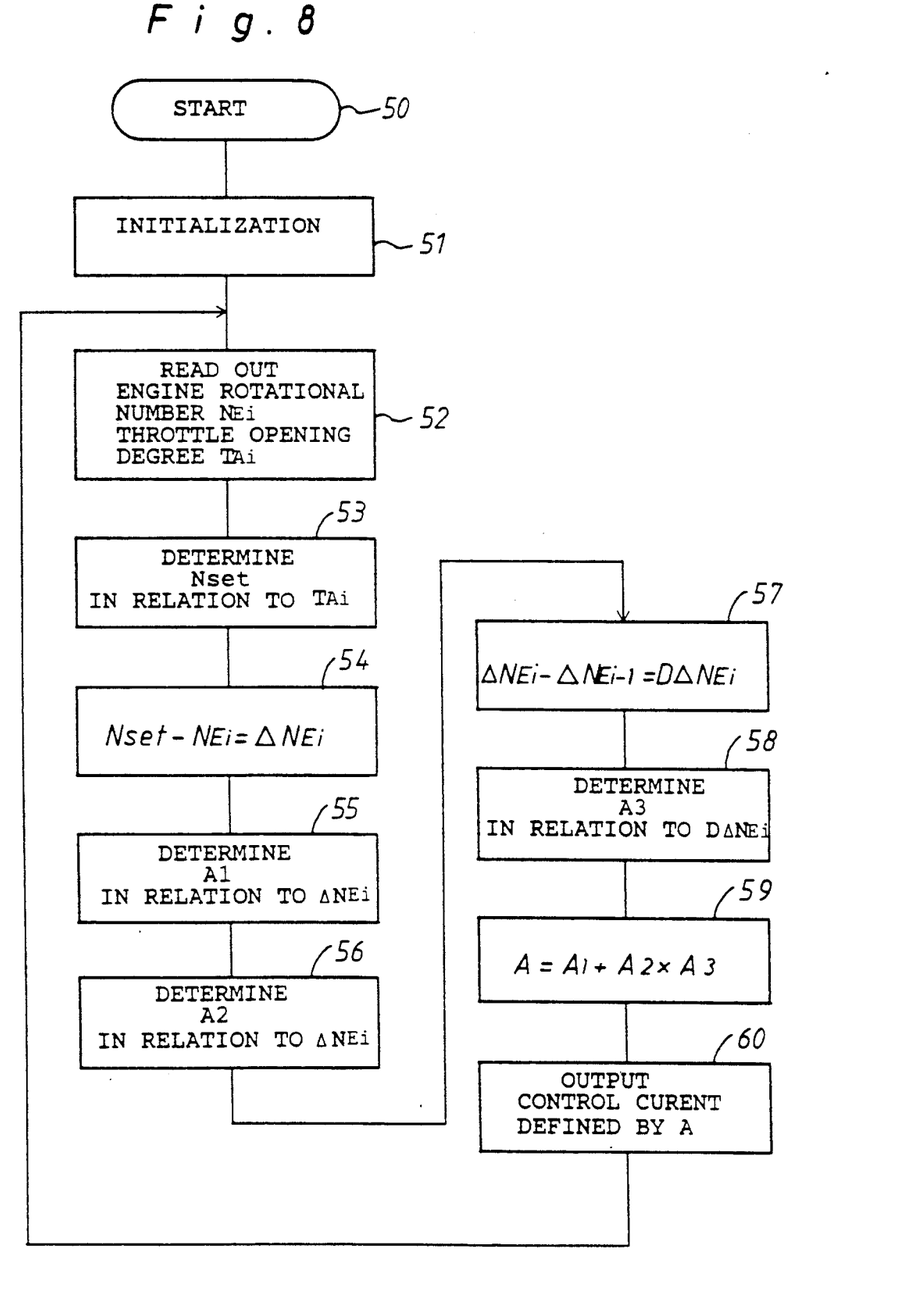
FIG. 8 is a flow chart of a control program executed by a microcomputer shown in FIG. 1.
Figure 9:
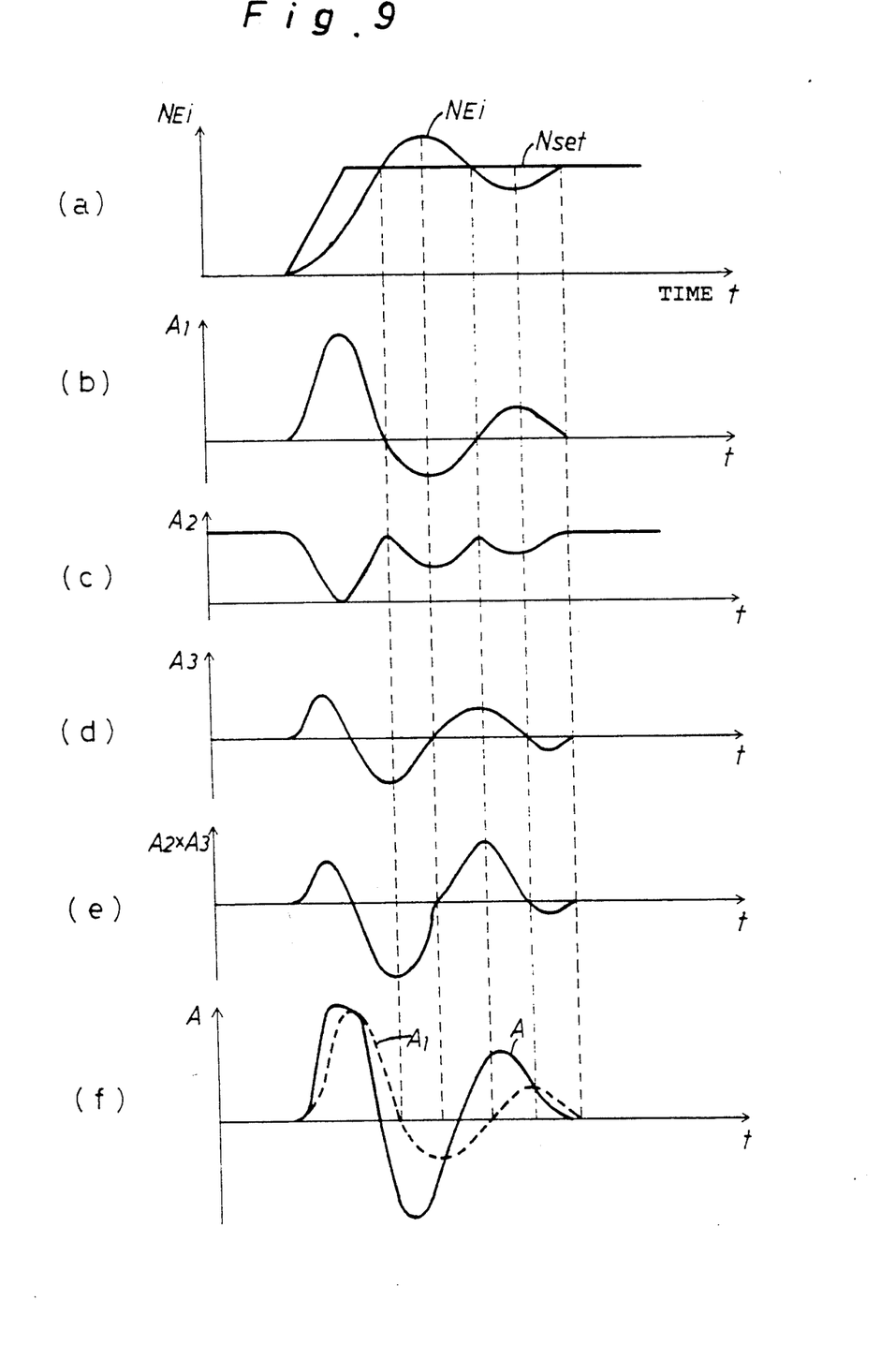
FIG. 9 is a time chart showing each lapse of time of the target rotation number $N_{set}$, the actual rotational number $N_{Ei}$, the standard control valve $A_1$, the first and second correction values $A_2$ and $A_3$, and the corrected control value A.

Hereinafter, the operation of the electric pitch control apparatus 30 will be described in detail with reference to the flow chart of FIG. 8 and a time chart of FIG. 9. Assuming that the prime engine of the aircraft has been started, the computer 34 is activated to initiate execution of the control program at step 50 shown in FIG. 8. At step 51, the CPU of computer 34 initializes variables for execution of the control program to repeat execution of a series of processings at step 52 to 60. After initialization of the variables at step 51, the CPU of computer 34 is applied with detection signals from the sensors 31, 32 to read out an actual rotational number $N_{Ei}$ of the prime engine and an opening degree $T_{Ai}$ of the engine throttle and to temporarily store the data in the RAM of computer 34. At the following step 53, the CPU of computer 34 determines a target rotational number $N_{set}$ in relation to the instant opening degree $T_{Ai}$ of the engine throttle on a basis of the map shown in FIG. 3 and causes the program to proceed to step 54. At step 54, the CPU of computer 34 calculates a difference $\Delta N_{Ei}$ between the target rotational number $N_{set}$ and the actual rotational number $N_{Ei}$ of the prime engine. When the program proceeds to step 55, the CPU of computer 33 determines a standard control value $A_1$ in relation to the calculated difference $\Delta N_{Ei}$ in rotational number on a basis of the map shown in FIG. 4. In FIG. 9, the character (a) represents time variation of the actual rotational number $N_{Ei}$ in contrast with the target rotational number $N_{set}$, and the character (b) represents time variation of the standard control value $A_1$.

Subsequently, the CPU of computer 34 determines at step 56 a first correction value $A_2$ in relation to the calculated difference $\Delta N_{Ei}$ in rotational number on a basis of the map shown in FIG. 5 and calculates at step 57 a difference $D\Delta N_{Ei}$ between instant and prior differences $\Delta N_{Ei}$ and $\Delta N_{Ei-1}$ in rotational number. At the following step 58, the CPU of computer 34 determines a second correction value $A_3$ in relation to the calculated difference $D\Delta N_{Ei}$ in rotational number on a basis of the map shown in FIG. 6 and calculates the following equation at step 59 to obtain a corrected control value A.

$$A = A_1 + A_2 \times A_3$$

Thus, the CPU of computer 34 produces at step 60 a control current defined by the corrected control value A and applies it to the solenoid a or b of flow control valve 23. When the corrected control value A is positive, the solenoid b of flow control valve 23 is energized by the control current to discharge an amount Q of hydraulic fluid defined by the corrected control value A from the hydraulic cylinder 11 so that the pitch angle of the propeller blade is decreased to increase the actual rotational number $N_{Ei}$ of the prime engine so as to coincide it with the target rotational number $N_{set}$. When the corrected control value A is negative, the solenoid a of flow control valve 23 is energized by the control current to supply an amount Q of hydraulic fluid under pressure defined by the corrected control value A into the hydraulic cylinder 11 so that the pitch angle of the propeller blade is increased to decrease the actual rotational number $N_{Ei}$ of the prime engine so as to coincide it with the target rotational number $N_{set}$.

Figure 5:
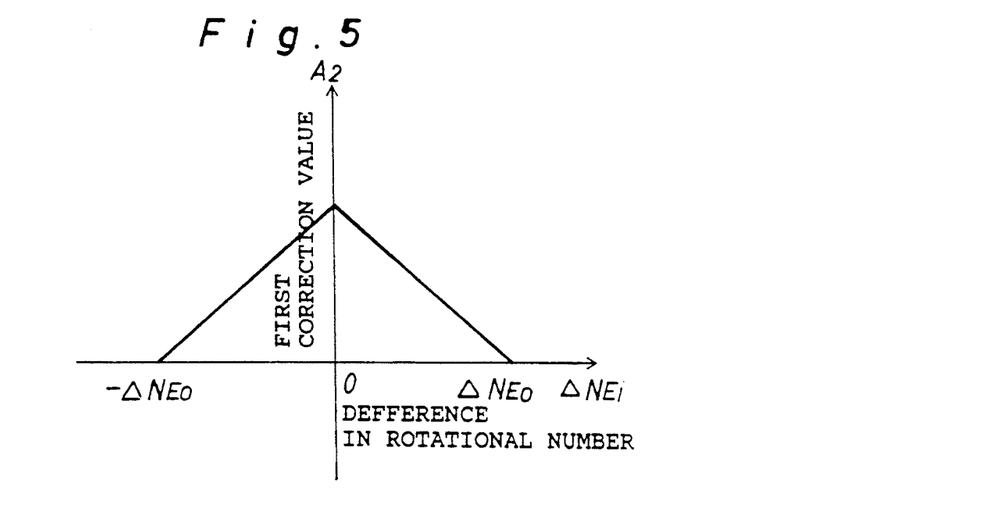
FIG. 5 is a map showing a first correction value $A_2$ in relation to the difference $N_{Ei}$ in rotational number.
Figure 6:
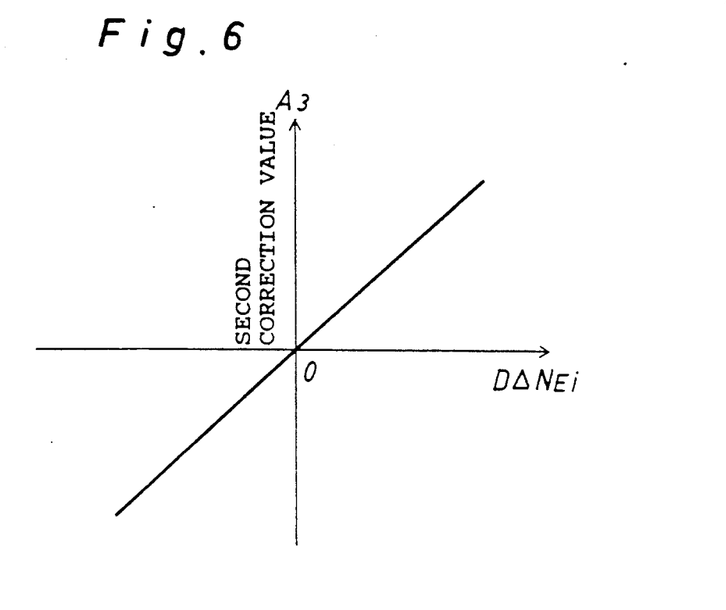
FIG. 6 is a map showing a second correction value $A_3$ in relation to the difference between instant and prior differences $N_{Ei}$ and $N_{Ei-1}$ in rotational number.
Figure 7:
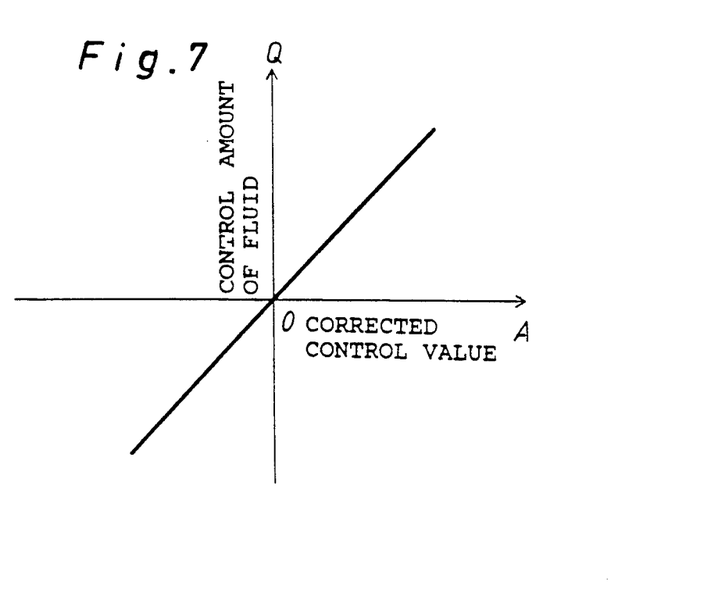
FIG. 7 is a map showing a supply amount Q of hydraulic fluid in relation to a corrected control value A.

From the above equation and the map of FIG. 5, it will be understood that when the absolute value of the difference $\Delta N_{Ei}$ in rotational number is larger than the predetermined value $\Delta N_{Eo}$, the value of $A_2 \times A_3$ becomes zero so that the corrected control value A is defined only by the standard control value $A_1$ to control the pitch angle of the propeller blade. When the absolute value of the difference $\Delta N_{Ei}$ in rotational number becomes smaller than the predetermined value $\Delta N_{Eo}$, the corrected control value A is defined by addition of the value of $A_2 \times A_3$ to the standard control value $A_1$. Since the value of $A_2 \times A_3$ is proportional to the difference $D\Delta N_{Ei}$ between instant and prior differences $\Delta N_{Ei}$ and $\Delta N_{Ei-1}$ in rotational number, the standard control value $A_1$ is corrected on a basis of the difference $D\Delta N_{Ei}$ in rotational number. Such a correction of the standard control value $A_1$ is effective to estimate the following variation of the difference $\Delta N_{Ei}$ in rotational number.

As shown by the character (f) in FIG. 9, the waveform of the corrected control value A is determined in advance to the waveform of the standard control value $A_1$. In control of the pitch angle of the propeller blade based on the corrected control value A, it is able to effectively avoid response delay in operation of the hydraulic actuator and the component parts of the pitch control mechanism. Accordingly, the pitch angle of the propeller blade can be controlled in response to operation of the engine output lever without causing any hunting phenomenon in rotation of the propeller. It is, therefore, able to promptly coincide the actual rotational number $N_{Ei}$ of the prime engine with the target rotational number $N_{set}$.

Figure 10:
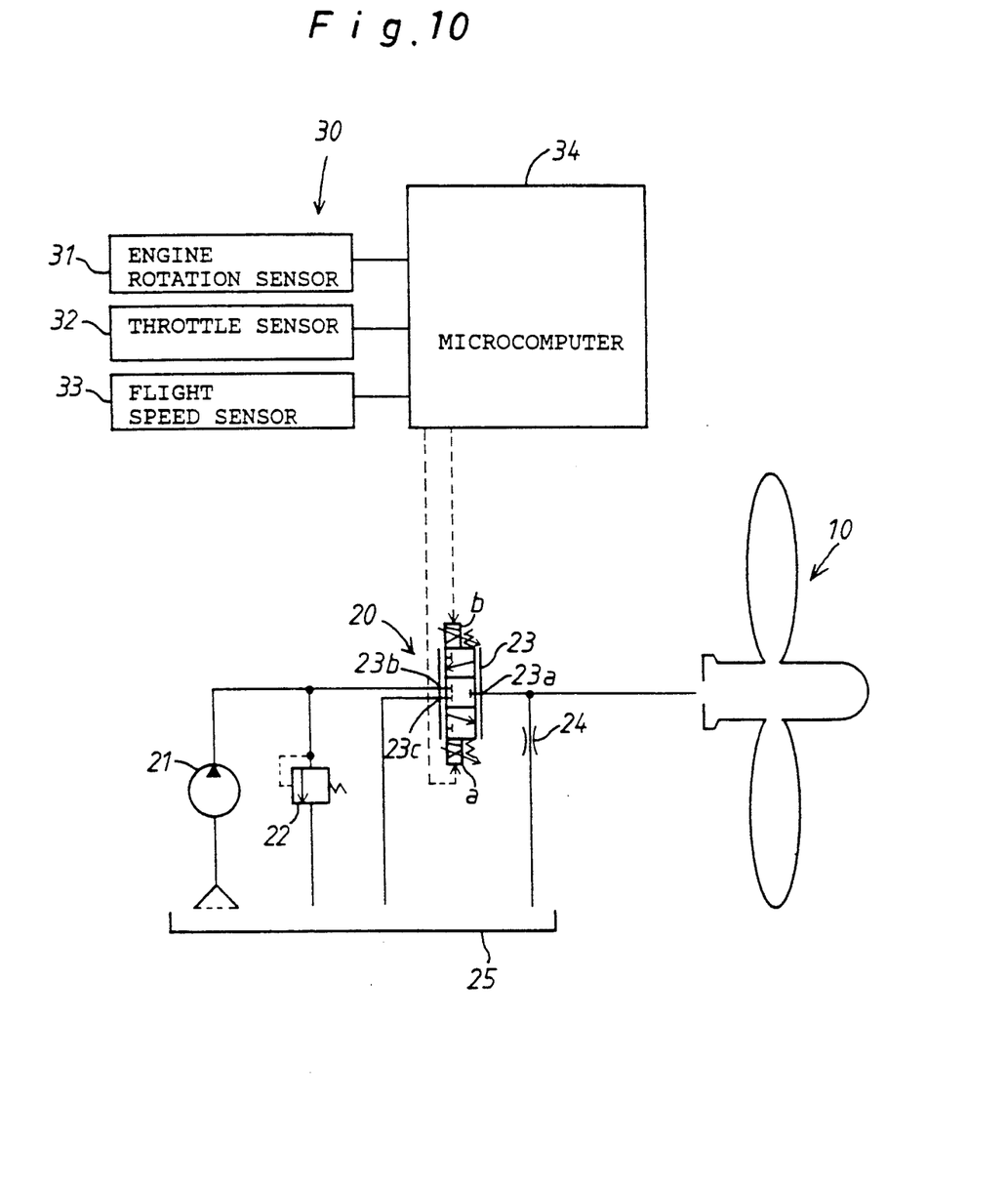
FIG. 10 is a circuit diagram of a hydraulic control system in combination with a modification of the electric control apparatus according to the present invention.
Figure 11:
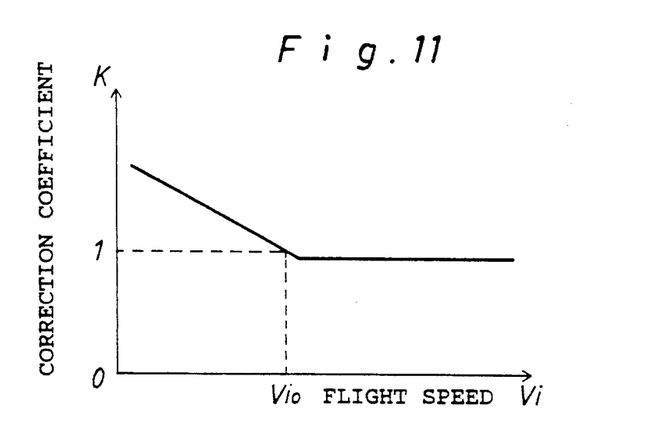
FIG. 11 is a map showing a correction coefficient in relation to a flight speed of the aircraft.

In FIG. 10 there is illustrated a modification of the electric pitch control apparatus according to the present invention, wherein the microcomputer 34 is further connected to a flight speed sensor 33 for detecting a flight speed of the aircraft. In this modification, the ROM of computer 34 is arranged to store the four kinds of two dimensional maps shown in FIGS. 3, 4, 5 and 6 and to further store a two dimensional map shown in FIG. 11, representing a correction coefficient k in relation to a flight speed of the aircraft. The correction coefficient k is defined to be linearly decreased from a predetermined positive value in accordance with increase of the flight speed $V_i$ from zero (0) to a predetermined speed $V_{io}$ at which the aircraft takes off and to be maintained as a constant value slightly less than "1" during flight of the aircraft at a higher speed $V_i$ than the predetermined speed $V_{io}$. The reason why the correction coefficient k is linearly decreased is to avoid a sudden change of the pitch angle of the propeller before and after taking-off of the aircraft. In this modification, the control program is also modified to additionally execute processing at step 053 and 054 as will be described below.

Figure 12:
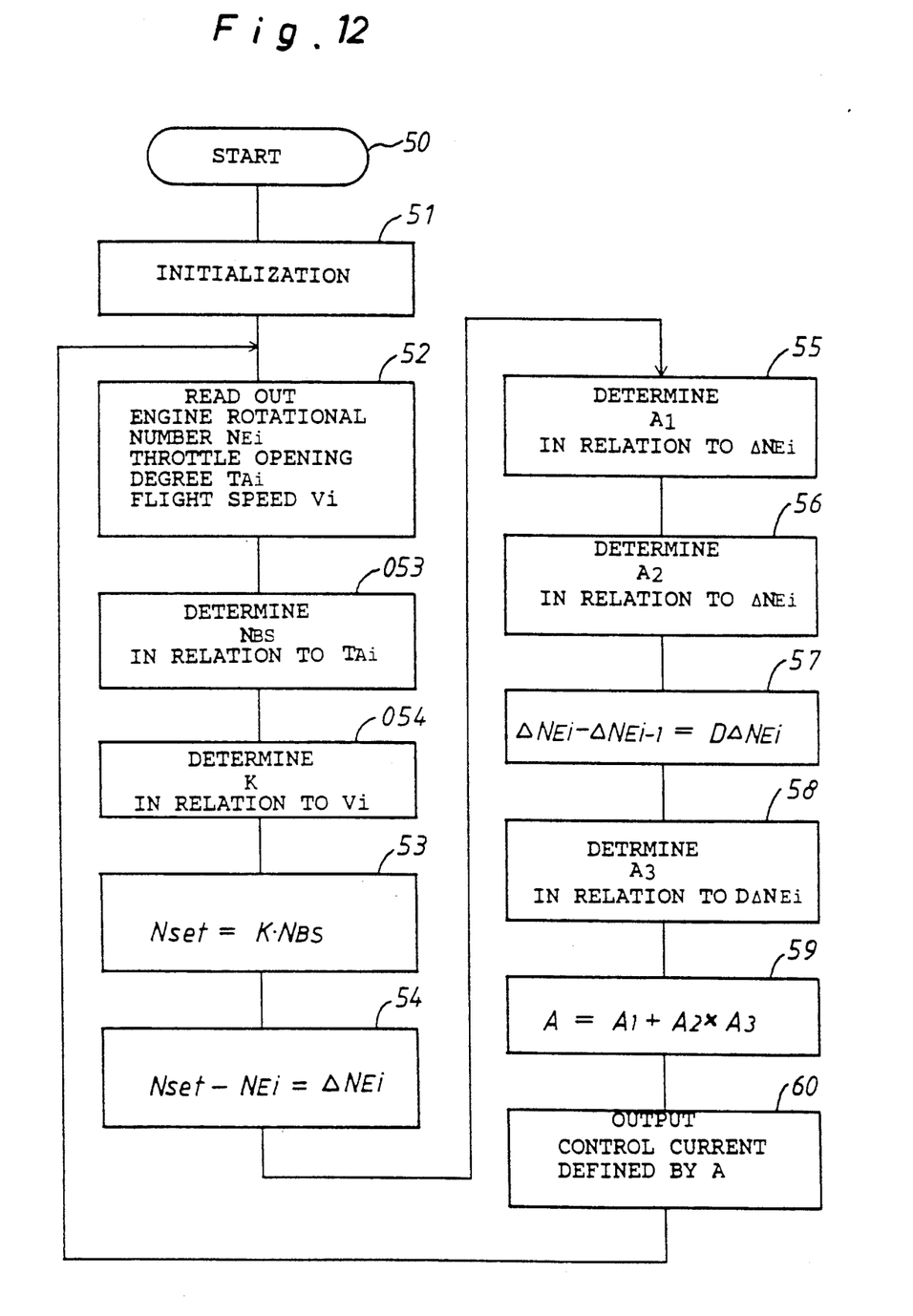
FIG. 12 is a flow chart of a modification of the control program shown in FIG. 8.

Assuming that the computer 34 has been activated to initiate execution of the modified control program at step 50 shown in FIG. 12, the CPU of computer 34 initializes at step 51 variables for execution of the modified control program and is applied with detection signals from the sensors 31, 32 and 33 at step 52 to read out an actual rotational number $N_{Ei}$ of the prime engine, an opening degree $T_{Ai}$ of the engine throttle and a flight speed $V_i$ of the aircraft so as to temporarily store the data in the RAM of computer 34. At the following step 053, the CPU of computer 34 determines a standard rotational number $N_{BS}$ in relation to the instant opening degree $T_{Ai}$ of the engine throttle and causes the program to proceed to step 054. At step 054, the CPU of computer 34 determines a correction coefficient k in relation to the flight speed $V_i$ of the aircraft on a basis of the map shown in FIG. 11. At the following step 53, the CPU of computer 34 calculates the following equation to determine a target rotational number $N_{set}$ on a basis of the standard rotational number $N_{BS}$ and the correction coefficient k.

$$N_{set} = k \cdot N_{BS}$$

When the program proceeds to step 54, the CPU of computer 34 calculates a difference $\Delta N_{Ei}$ between the target rotational number $N_{set}$ and the actual rotational number $N_{Ei}$ of the prime engine and causes the program to proceed to step 55. Subsequently, the CPU of computer 34 executes the control program at step 55 to 60 in the same manner as described above.

Figure 13:
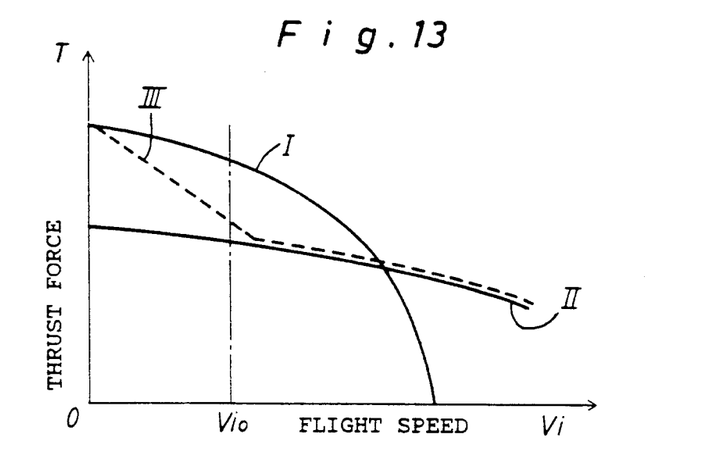
FIG. 13 is a graph showing a thrust force in relation to the flight speed of the aircraft.
Figure 14:
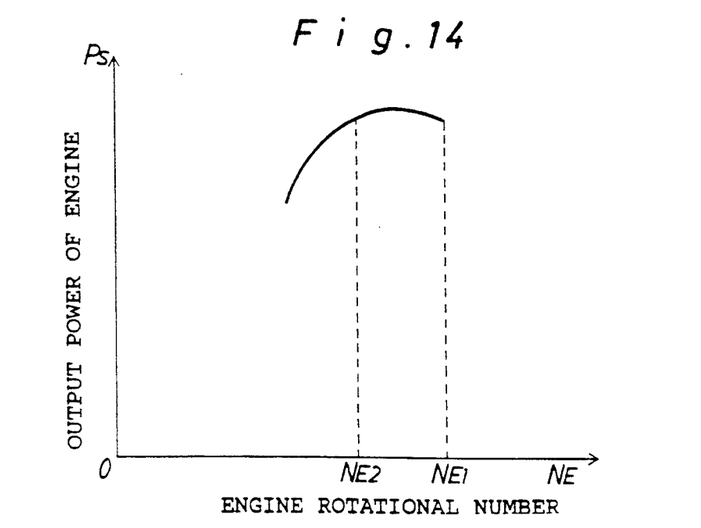
FIG. 14 is a graph showing an output power of the prime engine in relation to the actual rotational number.

From the above description, it will be understood that the correction coefficient k is determined to be larger than "1" when the flight speed $V_i$ is less than the predetermined speed $V_{io}$ before take-off of the aircraft. With such determination of the correction coefficient k, the target rotational number $N_{set}$ is determined to be larger than the standard rotational number $N_{BS}$. Thus, the pitch angle of the propeller blade is decreased on a basis of the difference $\Delta N_{Ei}$ between the target rotational number $N_{set}$ and the actual rotational number $N_{Ei}$ so that the engine rotational number is increased to effect a large thrust force as shown by a dotted line III in FIG. 13. As a result, the output power of the prime engine is maximized as shown in FIG. 14 to quickly accelerate and take off the aircraft in a short ground running distance. When the flight speed $V_i$ becomes higher than the predetermined speed $V_{io}$ after take-off of the aircraft, the correction coefficient k is determined to be smaller than "1", and the target rotational number $N_{set}$ is determined to be smaller than the standard rotational number $N_{BS}$. Thus, the pitch angle of the propeller blade is increased on a basis of the difference $\Delta N_{Ei}$ between the target rotational number $N_{set}$ and the actual rotational number $N_{Ei}$ so that the engine rotational number is decreased to gradually reduce the thrust force as shown by the dotted line III in FIG. 13. As a result, the propeller noise during flight of the aircraft can be reduced. Such control of the propeller pitch is also useful to enhance durability of the aircraft engine.

Figures 15A, 15B, 15C:
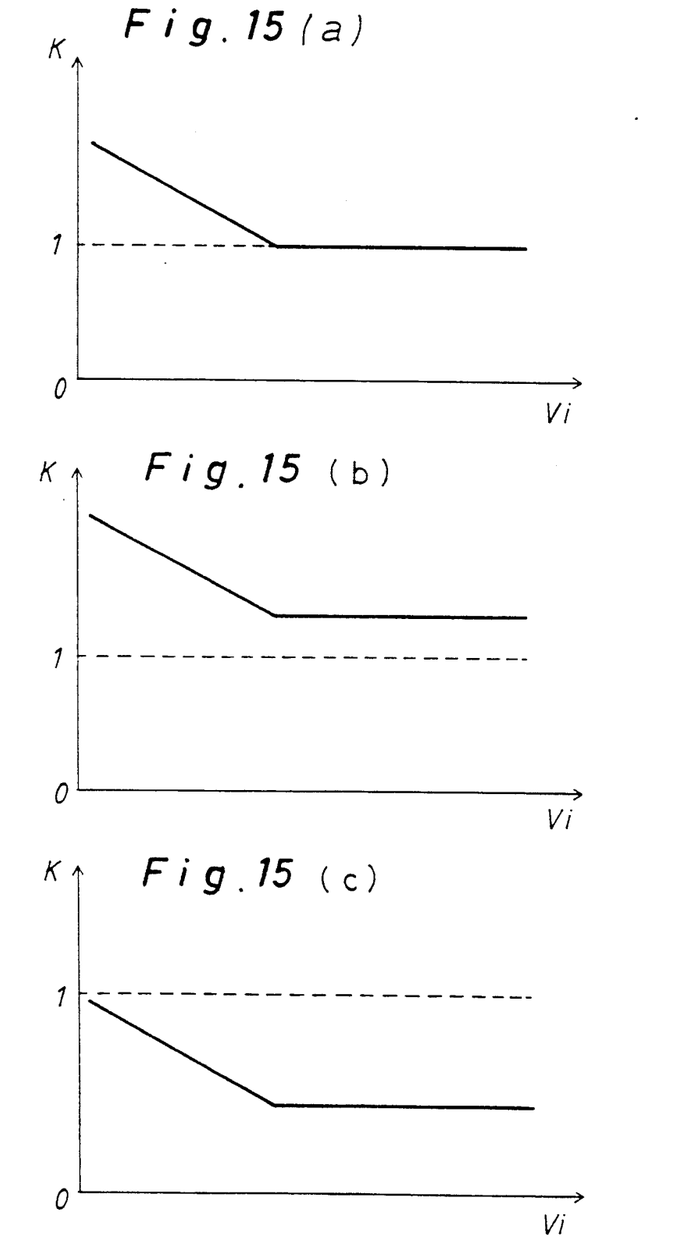

In a practical embodiment of the present invention, the correction coefficient k for determining the target rotational number $N_{set}$ may be defined as shown in FIGS. 15(a), 15(b) or 15(c). In FIG. 15(a), the correction coefficient k is defined to be larger than "1" before take-off of the aircraft and to be maintained as "1" during flight of the aircraft at a higher speed than the predetermined speed $V_{io}$. In FIG. 15(b), the correction coefficient k is defined to be maintained as a constant value larger than "1" during flight of the aircraft at a higher speed than the predetermined flight speed $V_{io}$. In FIG. 15(c), the correction coefficient k is defined to be linearly decreased from "1" before take-off of the aircraft and to be maintained as a constant value smaller than "1" during flight of the aircraft at a higher speed than the predetermined flight speed $V_{io}$.

What is claimed is:

1. An electric pitch control apparatus for a variable-pitch propeller of an aircraft equipped with a pitch control mechanism having an electrically controlled actuator for controlling a pitch angle of a blade of the propeller in accordance with a control current applied thereto, comprising:

an engine rotation sensor for detecting an actual rotational number of a prime engine of the aircraft;

a throttle sensor for detecting the degree to which a throttle of the prime engine is open;

first means for determining a target rotational number of the prime engine in relation to the degree to which said throttle is open;

second means for calculating a difference between the target and actual rotational numbers of the prime engine;

third means for determining a standard control value in relation to the calculated difference in rotational number; and fourth means for producing a control current defined by the standard control value and for applying the control current to said pitch control mechanism so that the pitch angle of the propeller blade is varied by operation of said actuator to coincide the actual rotational number of the prime engine with the target rotational number;

wherein said electric pitch control apparatus further comprises means for determining a first correction value in relation to the calculated difference in rotational number, means for determining a second correction value in relation to the rate of change of the calculated difference in rotational number, and means for correcting the standard control value based on the first and second correction values.

2. An electric pitch control apparatus as recited in claim 1, wherein said means for determining a first correction value comprises means for determining the first correction value as a positive value when an absolute value of the calculated difference in rotational number is less than a predetermined value and for determining the first correction value as zero when the absolute value of the calculated difference in rotational number is more than the predetermined value.

3. An electric pitch control apparatus as recited in claim 1, further comprising a flight speed sensor for detecting a flight speed of the aircraft and means for determining a correction coefficient in relation to the flight speed of the aircraft, and wherein said first means comprises means for determining a standard rotational number of the prime engine in relation to the degree to which said throttle is open and means for correcting the standard rotational number on the basis of the correction coefficient to determine the target rotational number.

4. An electric pitch control apparatus as recited in claim 3, wherein said means for determining a correction coefficient comprises means for linearly decreasing the correction coefficient from a predetermined value in accordance with increase of the flight speed from zero to a predetermined speed at which the aircraft takes off and for maintaining the correction coefficient as a constant value during flight of the aircraft at a higher speed than the predetermined speed.

* * * * *